(12) United States Patent
Ali et al.

(10) Patent No.: US 9,054,938 B2
(45) Date of Patent: Jun. 9, 2015

(54) QUADRATURE GAIN AND PHASE IMBALANCE CORRECTION

(75) Inventors: Isaac Ali, Bristol (GB); Nicholas Cowley, Wiltshire (GB)

(73) Assignee: Intel Corporation, Santa Clara, CA (US)

(*) Notice: Subject to any disclaimer, the term of this patent is extended or adjusted under 35 U.S.C. 154(b) by 214 days.

(21) Appl. No.: 12/802,075

(22) Filed: May 28, 2010

(65) Prior Publication Data

US 2011/0293048 A1 Dec. 1, 2011

(51) Int. Cl.
| | |
|---|---|
| *H03K 9/00* | (2006.01) |
| *H04L 27/00* | (2006.01) |
| *H04L 27/38* | (2006.01) |

(52) U.S. Cl.
CPC .................................. *H04L 27/3863* (2013.01)

(58) Field of Classification Search
CPC ............................ H04L 27/364; H04L 27/3863
USPC .......... 375/319, 326, 344, 345, 316, 373, 375, 375/376
See application file for complete search history.

(56) References Cited

U.S. PATENT DOCUMENTS

| | | | | |
|---|---|---|---|---|
| 4,953,182 | A * | 8/1990 | Chung | 375/344 |
| 5,369,411 | A * | 11/1994 | Lisle, Jr. | 342/194 |
| 5,999,802 | A * | 12/1999 | Aschwanden | 455/196.1 |
| 6,498,929 | B1 * | 12/2002 | Tsurumi et al. | 455/296 |
| 6,661,851 | B1 * | 12/2003 | Kang | 375/322 |
| 7,330,501 | B2 * | 2/2008 | Trachewsky et al. | 375/219 |
| 2002/0057752 | A1 * | 5/2002 | Denno | 375/346 |
| 2002/0097812 | A1 * | 7/2002 | Wiss | 375/316 |
| 2002/0160738 | A1 * | 10/2002 | Allott et al. | 455/304 |
| 2004/0038649 | A1 * | 2/2004 | Lin et al. | 455/130 |
| 2005/0041759 | A1 * | 2/2005 | Nakano | 375/324 |
| 2005/0215287 | A1 * | 9/2005 | Efland et al. | 455/562.1 |
| 2006/0025099 | A1 * | 2/2006 | Jung et al. | 455/313 |
| 2006/0083335 | A1 * | 4/2006 | Seendripu et al. | 375/332 |
| 2008/0089443 | A1 * | 4/2008 | Sanada et al. | 375/319 |
| 2010/0330942 | A1 * | 12/2010 | Choo et al. | 455/226.1 |

* cited by examiner

*Primary Examiner* — Shuwang Liu
*Assistant Examiner* — Sung Ahn
(74) *Attorney, Agent, or Firm* — Schubert Law Group PLLC

(57) ABSTRACT

Generally speaking, methods and apparatuses which correct errors related to phase and gain imbalances in quadrature tuners are disclosed. The quadrature tuner may be online and operating, receiving data. An embodiment may generate a squared signal from the IF frequency signal of the tuner. In generating the squared signal, the embodiment may enable the extraction of phase error and gain error information of the IF signal. The embodiment may determine a phase error component, a gain error component, or both, by frequency translation. The frequency translation may involve down-converting the signal associated with the error component to direct current (DC) signals and enable the determination of the associated phase error and/or gain error. The embodiments may generate an adjusted signal via the IF signal by applying a phase correction signal or gain correction signal to components used to correct the IF signal.

18 Claims, 5 Drawing Sheets

QUADRATURE GAIN AND PHASE IMBALANCE CORRECTION

FIELD

The embodiments herein are in the field of communications. More particularly, the embodiments relate to methods, apparatuses, and systems for correcting phase and gain imbalances in tuners, such as tuners which involve inter-stage quadrature conversion.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1A:
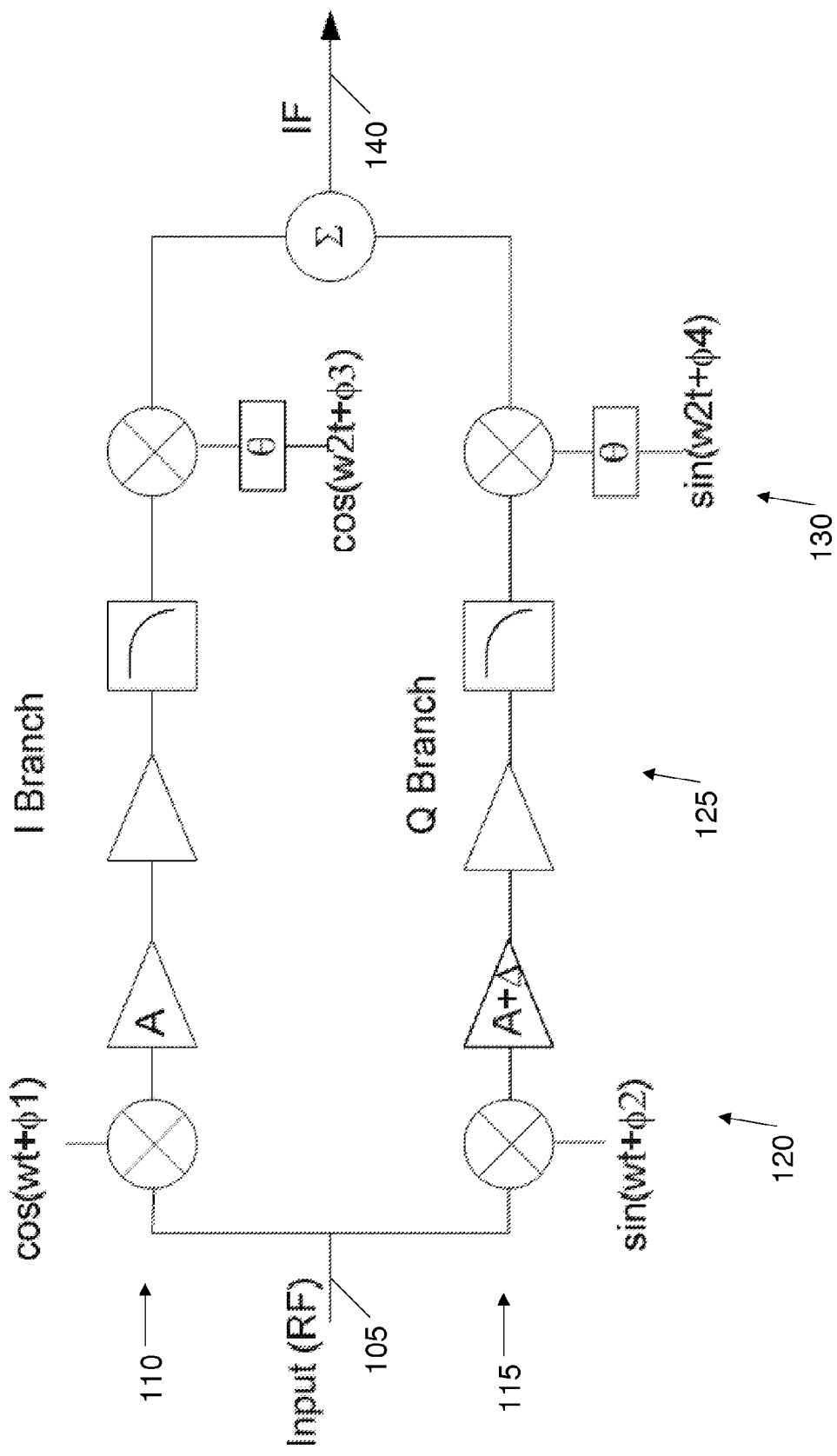
FIG. 1A depicts a quadrature tuner based on the Weaver Architecture.

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Electronic devices like personal computers, cellular telephones, and personal digital assistants (PDAs) may employ quadrature receivers for communication, such as when communicating with Wireless Personal Area Networks (WPANs) and Wireless Local Area Networks (WLANs). Additionally, network devices like Wireless Access Points (WAPs) and network routers may also employ quadrature conversion receivers and quadrature conversion transmitters to communicate with other devices in the network. The embodiments herein may serve to address quadrature imbalance problems in numerous types of tuners which involve interstage quadrature conversion, including but not limited to receivers in the electronic devices noted above.

Various communication systems often transmit data using an in-phase (I) and quadrature (Q) format. The I- and Q-channels in an IQ signal are phased-shifted relative to each other by 90 degrees, which is known as a quadrature relationship. An IQ radio tuner typically includes separate paths for the I-channel and the Q-channel. For instance, after the signal is received in a single antenna, the signal is split into two separate channels, where the I-channel receiver path can include a first set of mixers, amplifiers, filters, etc. to down-convert and process the I-channel data. Likewise, the Q-channel receiver path can include a second set of mixers, amplifiers, filters, etc. to down-convert and process the Q-channel data.

Quadrature imbalance in the radio tuner can impair the ability to successfully receive high speed data carried by the wireless signal. Quadrature imbalance may occur when the I-channel gain is different from that of the Q-channel, or when the phase relationship between the two channels is not exactly 90 degrees. In other words, quadrature imbalance is caused by gain and/or phase mismatches from the components in the I- and Q-channels of the IQ transceiver. For example, the receiver components in the I-channel can have slightly different amplitude and/or phase characteristics than the receiver components in the Q channel, introducing imbalance or mismatch errors in the I- and Q-baseband signals. Although the differences are usually small, these gain and phase imbalances reduce the effective signal-to-noise ratio of the IQ receiver, and increase the number of bit errors for a given data rate. As used herein, the term gain imbalanced may be interpreted as any relative gain difference between the "I" and the "Q" branches. Phase imbalance may be defined as any relative phase difference between the "I" and the "Q" branches which will result in the two signals having a phase relationship other than 90 degrees.

In current devices, the quadrature conversion consists of down-converting an RF signal to direct current, or near zero intermediary frequency (IF). The signal is then generally digitized as quadrature components using a high-performance analog-to-digital converter (ADC). The devices generally apply the quadrature imbalance correction in the digital domain. After the correction is applied, the devices generally up-convert the corrected digital signals to an analog composite IF signal. One disadvantage of applying the quadrature imbalance correction in the digital domain is the requirement for high-performance ADCs and digital-to-analog converters (DACs). Such digitization generally impairs the carrier-to-noise ratio (C/N) of the analog signal through quantization noise.

As will be illustrated, a radio receiver may generate an analog IF signal at an output of the receiver. Radio receivers that employ interstage quadrature conversion may require relatively low levels of quadrature contamination. For example, radio receivers with Weaver or Barber architectures generally require lower levels of quadrature contamination than can be achieved based on good design practice alone. Such radio receivers may employ a method of analog online calibration, described herein, which may make corrections of quadrature imbalance using the received signal. Such systems may correct for quadrature imbalance, yet require minimal silicon overhead to do so.

Generally speaking, methods, apparatuses, and systems that correct for quadrature imbalance in quadrature tuners are contemplated. An example system embodiment may be in a mobile computing device with wireless communications capabilities, such as an integrated wireless networking card. The card of the mobile computing device may have a quadrature tuner configured to receive transmitted data from a variety of wireless networking devices. The mobile computing device is just one embodiment. Countless other embodiments may comprise other types of computing devices, in either wired or wireless configurations.

While the wireless networking card is online and operating in the mobile computing device and receiving data from a wireless transmitter, the networking card may perform a self-calibration to address quadrature imbalance. The calibration may be triggered manually, such as at the request of a user, or automatically, such as periodically or whenever the quadrature imbalance exceeds a specified threshold.

A method embodiment may involve the wireless networking card generating a squared signal from an IF signal. The IF signal may be received from the output of the quadrature tuner in the wireless networking card, wherein the IF has a phase error component and/or a gain error component. The quadrature tuner may comprise a down-conversion stage and an up-conversion stage.

The wireless networking card may continue by determining a phase error component, a gain error component, or both, by frequency translation. The frequency translation may involve down-converting the signal associated with the error component to direct current (DC) signals and enable the determination of the associated phase error and/or gain error. The card may then continue by adjusting the IF signal by applying phase correction signals and/or gain correction signals to elements of the quadrature tuner. In regard to gain correction, the card may use the gain correction signals to adjust the gain of the "I" and "Q" paths via variable gain blocks in the base-band section of the quadrature tuner. In regard to phase correction, the card may use the phase correction signals to adjust the phase of the local oscillator signals supplied to the up-conversion section within the quadrature tuner. The phase correction signal and the gain correction signal may be determined via the phase error and the gain error, respectively.

An embodiment of an apparatus comprises a multiplier module configured to accept an IF signal from the output of a quadrature tuner, wherein the IF signal may comprise phase and gain error components due to imbalance of the quadrature tuner. The apparatus may use the IF signal to generate a squared signal. For example, the multiplier module may comprise a multiplier that generates the squared signal by combining the IF signal at both inputs of the multiplier. The quadrature tuner may comprise down-conversion and up-conversion stages.

The embodiment of the apparatus may further include a frequency translation module configured to down-convert a filtered signal from the squared signal to DC. The down-conversion of the filtered signal may enable the generation of a phase correction signal and a gain correction signal. The apparatus may also have a digital controller configured to enable application of the phase correction signal and the gain correction signal to corrective elements or components used to generate the IF signal, resulting in generation of an adjusted signal.

An alternative system embodiment may comprise a cellular telephone, a network router, or other communication device employing a quadrature tuner coupled to an antenna. For example, the tuner may comprise a down-conversion stage and an up-conversion stage. The system embodiment may also have a multiplier module configured to accept an IF signal from the output of the quadrature tuner. The multiplier module may generate a squared signal from the IF output, wherein the IF signal has a phase error component and a gain error component.

The system embodiment may also comprise a frequency translation module. The frequency translation module may be configured to down-convert a filtered signal from the squared signal to DC. Down-conversion of the filtered signal may enable the system embodiment to generate a phase correction signal and a gain correction signal. The phase correction signal and/or the gain correction signal may be used for correction of the quadrature imbalance for the IF signal.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth®, ZigBee™, or the like. Embodiments may be used in various other apparatuses, devices, systems and/or networks.

Conventional radio architectures generally require external filtering to remove unwanted channels in the signal spectrum that may interfere with the wanted signal. The Weaver architecture, illustrated in FIG. 1A, overcomes the need for external filtering by splitting and frequency-translating the radio frequency (RF) down to base-band. The Weaver architecture splits and frequency-translates the desired signal to the base-band to protect the desired signal from interference due to other channels in the signal spectrum, which eliminates the requirement for external filtering. Unfortunately, the splitting and frequency-translating causes the signal to act as self-interference. The level of self-interference is a function of the gain and phase imbalance.

The signals appearing in the "I" and the "Q" branches (elements 110 and 115) are phase-shifted with respect to each other by 90 degrees via the mixers in the down-conversion stage 120. The Weaver architecture may remove unwanted terms in the signal spectrum by signal conditioning in the base-band 125. The Weaver architecture then converts the base-band signals to an intermediary frequency (IF) in an up-conversion stage 130 before combining the up-converted signals to a single IF signal at an output 140. The Weaver architecture generally relies on relatively good gain and phase balance to provide satisfactory performance similar to other conventional architectures.

Several embodiments may enable detection and correction of the gain imbalance and the phase imbalance inherent in an architecture, such as the Weaver architecture. The embodiments may enable the detection and correction, without requiring any test tone injection or offline adjustments, by using the IF frequency while the tuner is online and streaming real data. In other words, the embodiments may be able to make corrections related to phase and gain errors while the tuner is operating, without having to take the tuner offline for the calibration process.

Various embodiments may detect and correct phase and gain imbalances by processing the sum and difference sidebands associated with an up-converter. In processing the sum and difference sidebands, the embodiments generate an error component based on the relative levels of the desired to undesired sideband. Embodiments that employ the techniques disclosed herein may offer immunity to common mode gain and phase ripple between the quadrature signal paths within an architecture. For example, an embodiment may offer immunity to common mode gain and phase ripple between signals of the "I" branch (element 110) and the "Q" branch (element 115) of the Weaver architecture depicted in FIG. 1A. Additionally, embodiments may perform the detection and processing in the analog domain, via the analog sections of the tuners, which may eliminate the need or requirement for high resolution digitization and digital processing.

Figure 1B:
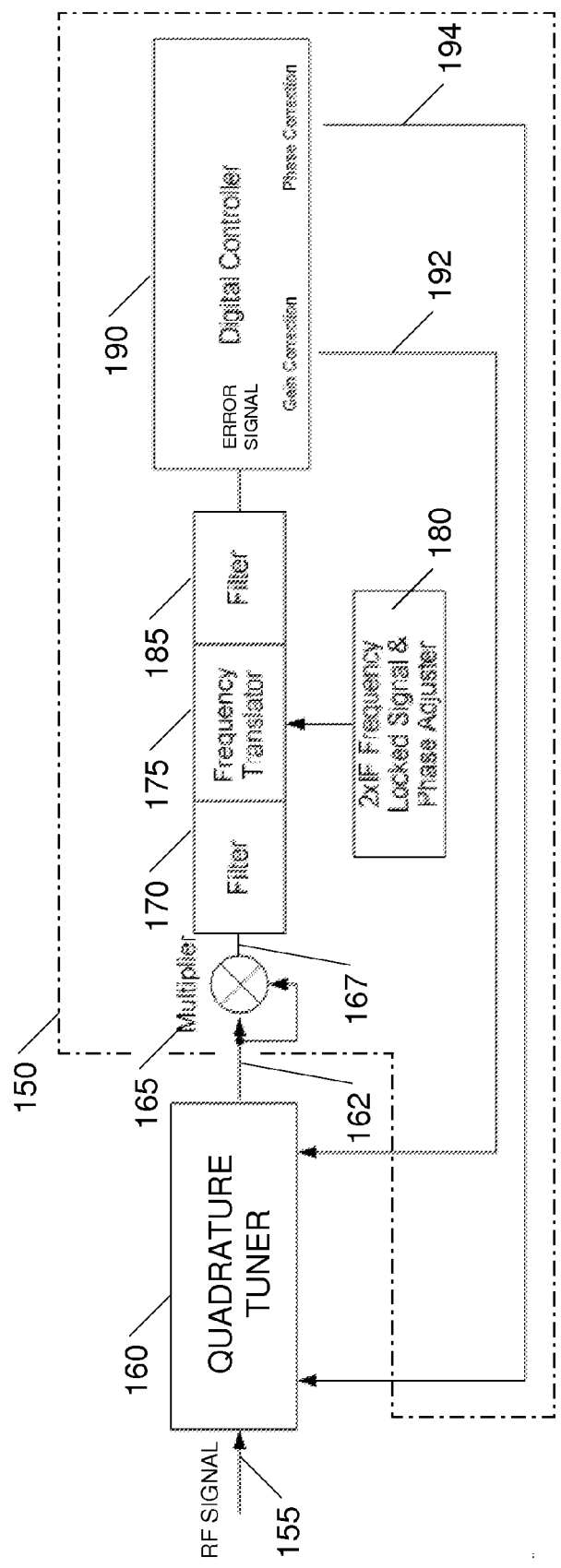
FIG. 1B shows an embodiment of a gain and phase correction loop for a quadrature tuner.

FIG. 1B shows an embodiment of a gain and phase correction loop 150 for a quadrature tuner 160. For example, gain and phase correction loop 150 may be able to detect and correct errors of phase and gain due to quadrature imbalance in quadrature tuner 160. In some embodiments quadrature tuner 160 may comprise a tuner based on the Weaver architecture, such as the tuner of FIG. 1A. In other embodiments quadrature tuner 160 may comprise a tuner based on the Barber architecture. In even further embodiments, quadrature tuner 160 may comprise a tuner based on a different architecture which has a quadrature down-conversion stage followed by a quadrature up-conversion stage. In other words, the arrangement or configuration of quadrature tuner 160 may vary in different embodiments.

Quadrature tuner 160 may receive an RF signal at input 155. The RF signal may comprise the desired signal, which contains the data stream of interest, along with unwanted signals. Quadrature tuner 160 may generate an intermediary frequency (IF) signal at output 162. If quadrature tuner 160 were perfectly balanced and had perfect filtering, the IF signal at output 162 would consist of the desired signal only. However, practical applications of quadrature tuner 160 are likely to have gain and phase imbalance, resulting in the desired signal being overlaid with the spectrally inverted version of itself. The level of the inverted signal, with respect to the desired signal, may be dependent on the level or amount of quadrature imbalance.

Figure 2A:
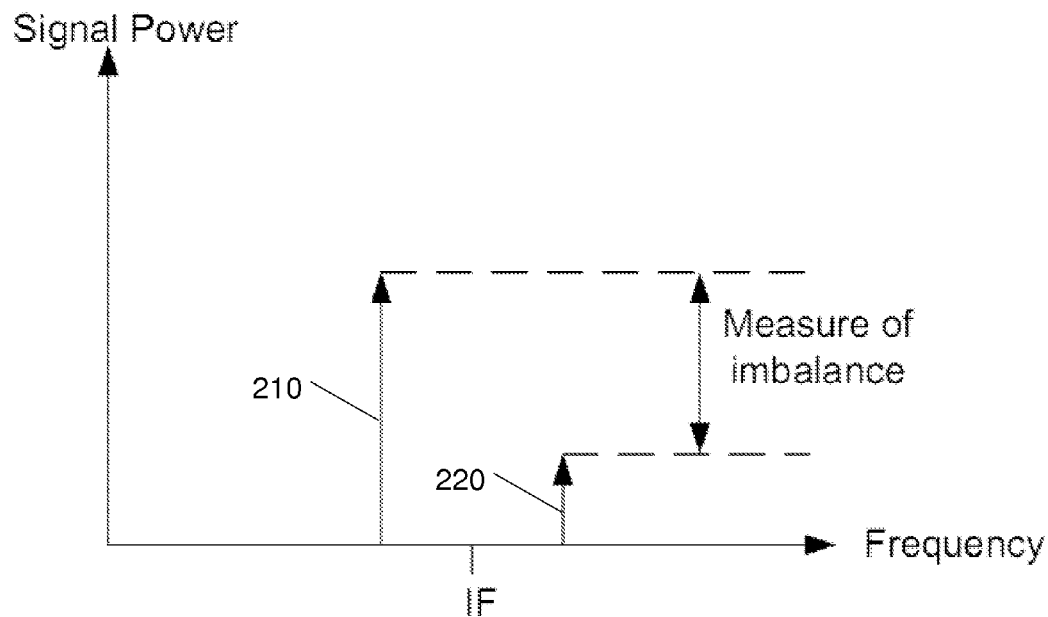
FIG. 2A illustrates how an output signal for a single tone may comprise two tones due to quadrature imbalance.

One may more easily visualize the problem posed by the gain and phase imbalance by assuming that the desired signal consists of a single tone which is frequency-offset from its ideal position, or frequency. As noted, when the input signal comprises a single tone the output signal of the quadrature tuner should also comprise a single tone in a perfectly balanced system. When the quadrature tuner system is not perfectly balanced, the output may comprise two tones. FIG. 2A illustrates how an output signal for a single tone may comprise a first tone 210 and a second tone 220 due to quadrature imbalance.

Continuing our discussion with reference to FIG. 1B and FIG. 2A, correction loop 150 may square the output signal from output 162 via multiplier 165. Squaring the output signal may produce a squared signal at multiplier output 167, wherein the square signal comprises many terms. Stated differently and more generally, a multiplier stage may generate an error signal from the IF signal at output of a quadrature tuner. One of the terms of the squared signal is known as the upper-image side-band. This upper-image side-band term is a result of the two tones (210 and 220) multiplying with each other. One characteristic of the upper-image side-band term is that the term is always at a known frequency position equal to 2 (two) times the frequency used to up-convert the signal. The characteristic of the upper-image side-band term always being at a known frequency position equal to two times the frequency for the up-conversion is also true for a digital signal. There will be a signal component at two times the IF frequency, wherein the signal component at two times the IF frequency is a measure of the level of quadrature imbalance.

Figure 2B:
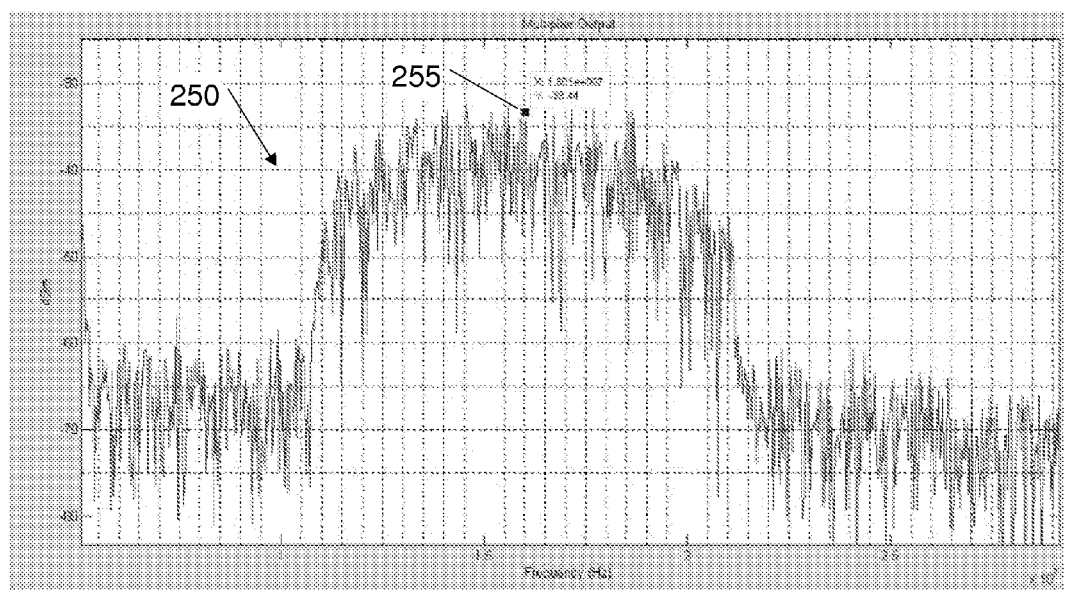
FIG. 2B illustrates an example energy distribution of a squared signal at the output of a multiplier.

FIG. 2B illustrates an example energy distribution 250 of a squared signal at the output of a multiplier which may precede a gain and phase correction loop in an embodiment. Marker 255 is at the position where the relevant information sits, wherein the relevant information pertains to the gain and phase error. For example, energy distribution 250 may be centered around 16 megahertz (MHz), which would be a frequency equal to two times an IF frequency of 8 MHz. The gain and phase correction loop in an embodiment may isolate the signal of interest by frequency translation. For example, elements of the gain and phase correction loop may perform frequency translation to DC when extracting information pertaining to the phase imbalance signal. The elements of the gain and phase correction loop may also perform frequency translation to DC when extracting information pertaining to the gain imbalance signal. As will be illustrated, a digital controller of the correction loop may further process the isolated signals of gain and phase error to generate correction signals and values to be used to correct or compensate for the quadrature imbalance.

Isolation and frequency translation of the signal of interest by a correction loop may involve numerous elements or function blocks. In the embodiment of FIG. 1B, gain and phase correction loop 150 comprises a first filter 170 and a second filter 185 at the input and output of a frequency translator 175. Filters 170 and 185 may provide a means of cleaning up the multiplied signals from multiplier 165. For example, depending on the embodiment, filters 170 and 185 may comprise two DC blockers and two filters.

Frequency translator 175 may isolate the signal of interest by translating the input signal to DC. Frequency translator 175 may receive a locking signal from signal generator 180. Signal generator 180 may produce a signal with a frequency equal to two times the IF for the multiplier 165. For example, signal generator 180 may produce a signal having a frequency of 16 MHz when the IF frequency to the multiplier 165 is 8 MHz. In the embodiment of FIG. 1B, signal generator 180 also comprises an adjustable phase element to enable the extraction of both the gain error and the phase error. For example, the adjustable phase element may adjust the phase of the signal from signal generator 180 to one phase angle for extraction of the gain error, yet adjust the phase of the signal to a second phase angle for extraction of the phase error.

The IF signal at output 162 for an embodiment will comprise the wanted signal along with unwanted terms due to imbalances in the system. Stated in mathematical terms:

$$DetectorInput = I_{IF} + Q_{IF}$$
$$= a_{rf}(t)\cos(\omega_{IF}t - \omega_{err}t - A(t)) +$$
$$a_{rf}(t)\cos(\omega_{IF}t + \omega_{err}t + B(t)) +$$
$$a_{rf}(1 + \alpha)(t)\cos(\omega_{IF}t - \omega_{err}t - C(t)) -$$
$$a_{rf}(t)(1 + \alpha)\cos(\omega_{IF}t + \omega_{err}t + D(t)) + \ldots$$

Where:

$$A(t)=\theta_{e1}-\theta_{e3}-\theta_{rf}(t)$$

$$B(t)=\theta_{e1}+\theta_{e3}\theta_{rf}(t)$$

$$C(t)=\theta_{e2}-\theta_{e4}-\theta_{rf}(t)$$

$$D(t)=\theta_{e2}+\theta_{e4}-\theta_{rf}(t)$$

The IF signal at output 162 serves as input to the gain and phase correction loop 150. The gain and phase correction loop 150 first squares the IF signal, resulting in information related to the imbalance being frequency translated to a frequency equal to two times the IF frequency:

$$[I_{IF}+Q_{IF}]^2 =$$
$$a_{rf}^2(t)\cos(2\omega_{IF}t+B(t)-A(t))-(1+\alpha)a_{rf}^2(t)\cos(2\omega_{IF}t+D(t)-A(t))+$$
$$(1+\alpha)a_{rf}^2(t)\cos(2\omega_{IF}t+B(t)-C(t))-$$
$$(1+\alpha)^2 a_{rf}^2(t)\cos(2\omega_{IF}t+D(t)-C(t))+\ldots$$

Where:

$$B(t)-A(t)=2\cdot\theta_{e3}$$

$$D(t)-A(t)=\theta_{e2}-\theta_{e1}+\theta_{e4}+\theta_{e3}=\theta_x$$

$$B(t)-C(t)=\theta_{e1}-\theta_{e2}+\theta_{e3}+\theta_{e4}=\theta_y$$

$$D(t)-C(t)=2\cdot\theta_{e4}$$

The gain and phase correction loop 150 may amplify the squared signal before frequency translating the signal of interest to DC in order to extract information related to phase imbalance. For the purposes of phase correction, correction loop 150 mixes the signal at the output of multiplier 165 with:

$$LO\_mixer_{phase} = \cos\left(2\omega_{IF}t - \frac{\pi}{2}\right)$$

The gain and phase correction loop 150 may filter the output of the mixer to produce:

$$[I_{IF}+Q_{IF}]^2|_{@phase\_DC\_LPF} =$$
$$a_{rf}^2(t)\cos\left(2\theta_{e3}+\frac{\pi}{2}\right)-a_{rf}^2(t)\cos\left(\theta_x+\frac{\pi}{2}\right)-\alpha\cdot a_{rf}^2(t)\cos\left(\theta_x+\frac{\pi}{2}\right)+$$
$$a_{rf}^2(t)\cos\left(\theta_y+\frac{\pi}{2}\right)+\alpha\cdot a_{rf}^2(t)\cos\left(\theta_y+\frac{\pi}{2}\right)-a_{rf}^2(t)\cos\left(2\theta_{e4}+\frac{\pi}{2}\right)-$$
$$\alpha\cdot a_{rf}^2(t)\cos\left(2\theta_{e4}+\frac{\pi}{2}\right)-\alpha^2\cdot a_{rf}^2(t)\cos\left(2\theta_{e4}+\frac{\pi}{2}\right)+\ldots$$

For the purpose of illustration, one may consider phase imbalance in isolation by setting alpha to 0 and ignoring terms which are not at DC.

$$[I_{IF}+Q_{IF}]^2|_{@phase\_DC\_LPF} = a_{rf}^2(t)\cos\left(2\theta_{e3}+\frac{\pi}{2}\right)-$$
$$a_{rf}^2(t)\cos\left(\theta_x+\frac{\pi}{2}\right)+a_{rf}^2(t)\cos\left(\theta_y+\frac{\pi}{2}\right)-a_{rf}^2(t)\cos\left(2\theta_{e4}+\frac{\pi}{2}\right)$$

$$\text{phase\_error} = [I_{IF}+Q_{IF}]^2|_{@phase\_DC\_LPF}$$

When phase imbalance is zero the sum of the terms above must be zero, which is possible if:

$$\sin(2\theta_{e3})=\sin(\theta_x) \text{ and } \sin(\theta_y)=\sin(2\theta_{e4})$$

$$\theta_{e2}-\theta_{e1}+\theta_{e4}+\theta_{e3}=\theta_x$$

$$\theta_{e1}-\theta_{e2}+\theta_{e3}+\theta_{e4}=\theta_y$$

The correction is applied during the up-conversion process and is defined below:

$$\theta_{e2}-\theta_{e1}+\theta_{e4}+(\theta_{e3}+\theta_{c\_up\_I})=\theta_x$$

$$\theta_{e2}-\theta_{e1}+\theta_{e4}+(\theta_{e3}+\theta_{c\_up\_I})=2\cdot(\theta_{e3}+\theta_{c\_up\_I})$$

$$\theta_{c\_up\_I}=-\theta_{e1}+\theta_{e2}-\theta_{e3}+\theta_{e4}$$

$$\theta_{e1}-\theta_{e2}+\theta_{e2}+(\theta_{e4}\theta_{c\_up\_Q})=\theta_y$$

$$\theta_{e1}-\theta_{e2}+\theta_{e3}+(\theta_{e4}+\theta_{c\_up\_Q})=2\cdot(\theta_{e4}+\theta_{c\_up\_Q})$$

$$\theta_{c\_up\_Q}=\theta_{e1}-\theta_{e2}+\theta_{e3}-\theta_{e4}$$

$$\theta_{c\_up\_I}=-\theta_{c\_up\_Q}$$

The above set of equations confirms that a correction signal in either the "I" or the "Q" branch during the up-conversion may cancel phase imbalance introduced into the system.

The error signal contains a great deal of noise which may be filtered to some extent in the analog domain using, for example, filter 185. Digital controller 190 may be designed to operate and extract the relevant information in the presence of a substantial amount of noise.

For the purposes of gain correction, gain and phase correction loop 150 may frequency translate the output of multiplier 165 to DC using:

$$LO\_mixer_{gain}=\cos(2\omega_{IF}t)$$

After filtering of the down-converted signal, one has:

$$[I_{IF}+Q_{IF}]^2|_{@gain\_DC\_LPF}=a_{rf}^2(t)\cos(2\theta_{e3})-a_{rf}^2(t)\cos(\theta_x)+a_{rf}^2(t)\cos(\theta_y)-a_{rf}^2(t)\cos(2\theta_{e4})+\alpha(a_{rf}^2(t)\cos(\theta_y)-a_{rf}^2(t)\cos(\theta_x)-a_{rf}^2(t)\cos(2\theta_{e4})-a_{rf}^2(t)\cos(2\theta_{e4}))+\ldots$$

Figure 3:
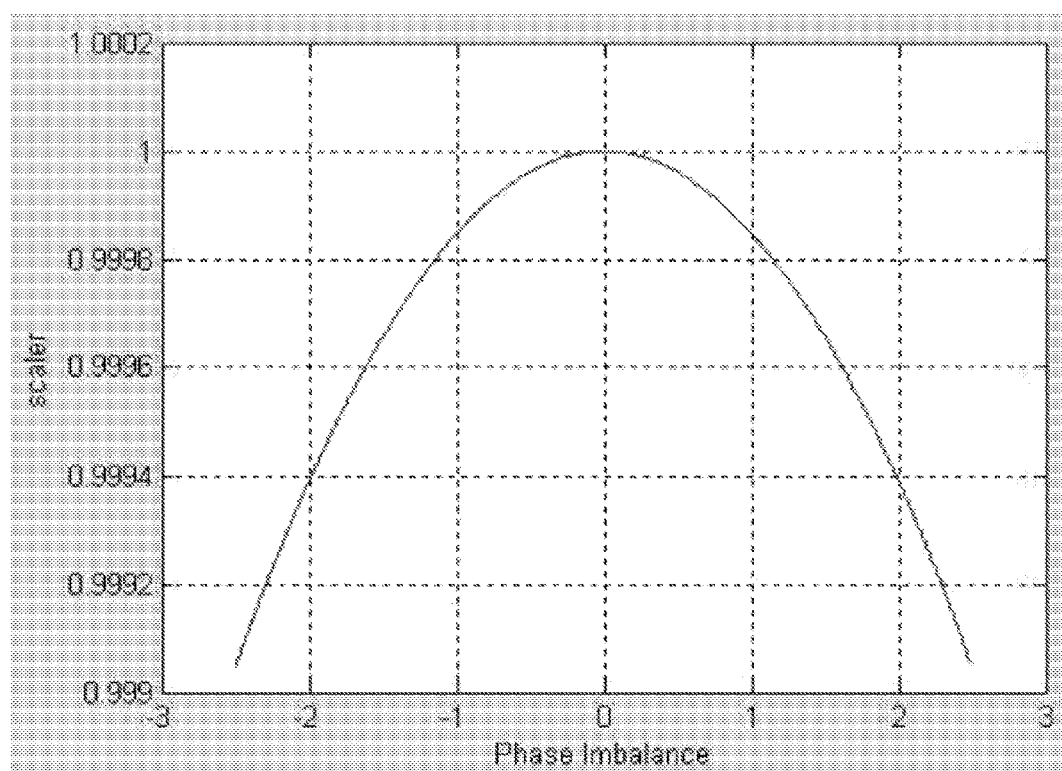
FIG. 3 shows a plot for cos(x), where x has a range of −2.5 to 2.5 degrees.

Depending on the embodiment, the range of phase imbalance may vary. In many embodiments, the phase imbalance may be expected to have a range from −2.5 to 2.5 degrees. With the phase imbalance falling somewhere −2.5 and 2.5 degrees, the cosine terms will all be close to a value of one. This relationship is illustrated in FIG. 3, which shows a plot for cos(x), where x has a range of −2.5 to 2.5 degrees. As FIG. 3 demonstrates, whenever the value of the phase imbalance falls somewhere between −2.5 and 2.5 degrees, the cosine function of each of the phase imbalance angles will range from 0.999 to 1. Based on this relationship, one may approximate the gain error:

$$[I_{IF}+Q_{IF}]^2|_{@gain\_DC\_LPF}=-3\cdot a_{rf}^2(t)\cdot\alpha+\ldots$$
$$\text{gain\_error}=[I_{IF}+Q_{IF}]^2|_{@gain\_DC\_LPF}$$

The missing terms, as well as the modulation, represent noise contamination which many embodiments need to filter using filter 185.

As described and illustrated in FIG. 1B, digital controller 190 may receive the error signals for both gain errors and phase errors. As the error signals exit the frequency translation stage, such as from filter 185, each error signal may comprise a wanted DC term as well as unwanted noise. The unwanted noise may dominate the error signal.

Digital controller 190 may sample the analog waveforms of the error signals that exit the frequency translation stage using a 1-bit analog-to-digital converter (ADC). Digital controller 190 may accumulate the resulting samples, which can be 0 or 1, for a predefined period. Digital controller 190 may compare the accumulated result, which may be in the form of an average value for all of the samples for one period, against a threshold. If the value is greater than the threshold, digital controller 190 may increment an error counter for the respective error signal.

For example, in various embodiments, the output of the 1-bit ADC will generate a stream of 1 and 0s. Digital controller 190 may accumulate digits of the stream for a fixed time, which may be referred to as "T_meas". At the end of each "T_meas" period, digital controller 190 may compare the output of the accumulator against a threshold. If the accumulated value is above the threshold, then digital controller 190 may increment an error counter. Otherwise, if the accumulate value is not above the threshold, digital controller 190 may decrement the error counter. When the error counter changes value, digital controller 190 may reset the measurement accumulator so that the measurement accumulator has no memory of the previous result.

In numerous embodiments, digital controller 190 may not interrogate the output of the error counter until some number (N) of measurements have been made, where each measurement takes a time equal to "T_meas". For these embodiments, the output of the error counter may fall into one of three possible categories:

1) Let N=100. If the error counter was incremented every time, then the output of the error counter at the end of N measurements would be 100.

2) Let N=100. If error counter was decremented every time then the output of the error counter at the end of N measurements would be −100.

3) Let N=100. If error counter was decremented 50 times and incremented 50 times (in no particular order) then the output of the error counter at the end of N measurements would be zero.

In many embodiments, N may be programmable. At the end of the N measurements, digital controller 190 may determine that the result is inconclusive and take no corrective action. For example, at the end of N measurements digital controller 190 may determine that the result is inconclusive if the output is between ±20 and do nothing to the correction value. If the value is above +20, digital controller 190 may determine that there is enough data to increment the correction value. If the value is below −20, digital controller 190 may determine that there is enough data to decrement the correction value. Again, for many embodiments, the decision to take corrective action may be based on block-processing N measurements and is not carried out on a measurement-by-measurement basis.

As noted in the example the threshold may be 20 for both positive and negative, but the value may programmable. Additionally, some alternative embodiments may set different values for the upper and lower threshold values, such as 20 for positive but 25 for negative. Once the correction value has been changed, digital controller 190 may reset the error counter to remove any memory of previous decisions, or corrective actions.

Various embodiments comprise separate accumulators and error counters for gain and phase correction. For example, digital controller 190 may have accumulators and error counters dedicated to samples of the phase error signals and have other accumulators and error counters dedicated to samples of the gain error signals. Alternative embodiments may combine the different sets by having memory to store the states of the system.

FIG. 1B depicts just one embodiment of an apparatus that may correct errors of phase and gain imbalance in a quadrature tuner. For example, the apparatus may comprise, or at least form a part of, a wireless network communication device which employs quadrature tuner 160, such as a LAN network device. One or more elements of the apparatus may be in the form of hardware, software, or a combination of both hardware and software. For example, in the embodiment depicted in FIG. 1B, one or more portions of digital controller 190 may comprise instruction-coded modules stored in one or more memory devices. More specifically, digital controller 190 may comprise software or firmware instructions of an application in a hardware module, such as a DSP that employs a microprocessor for performing complex calculations.

In various embodiments, one or more of the modules of the apparatus may comprise hardware-only modules. For example, signal generator 180, filter 170 and/or filter 185, frequency translator 175, and the multiplier module comprising multiplier 165 may each comprise a portion of an integrated circuit chip. In such embodiments, one or more of the modules may comprise such hardware elements as resistors, capacitors, inductors, diodes, analog transistors, and although analog in nature even include, depending on the embodiment, CMOS transistors, combinations of logic gates, and state machines. In various alternative embodiments, one or more of the modules of the apparatus may comprise a combination of hardware and software modules.

In many embodiments, digital controller 190 may comprise dynamic random access memory (DRAM) to store the measured sample values. In some embodiments, digital controller 190 may employ another type of memory to store the measured parameters and/or threshold comparison values, such as static RAM or flash memory. As noted, digital controller 190 may comprise a DSP in some embodiments. In alternative embodiments, digital controller 190 may comprise a dedicated processor, such as a microcontroller of an application specific integrated circuit (ASIC).

The number of modules in an embodiment of a quadrature imbalance correction apparatus may vary. Some embodiments may have fewer modules than those module depicted in FIG. 1B. For example, in the embodiment depicted in FIG. 1B, the apparatus comprises a frequency translator 175 and signal generator 180. An alternative embodiment may integrate frequency translator 175 and signal generator 180 into a single module. Further embodiments may include more modules or elements than the ones shown in FIG. 1B. For example, an alternative embodiment may include two separate correction loops, each comprising a multiplier module, filters, a frequency translation module, and digital controller. Such an arrangement in an embodiment may determine and correct phase error at the same time of determining and correcting gain error. Other embodiments may include more of the other modules. Additionally, some embodiments may have some modules in two separate correction loops, yet have other modules which are included in both loops. For example, and embodiment may have two separate correction loop elements for devices which are in the analog domain, yet share one digital controller for the correction value/signal determination.

Figure 4:
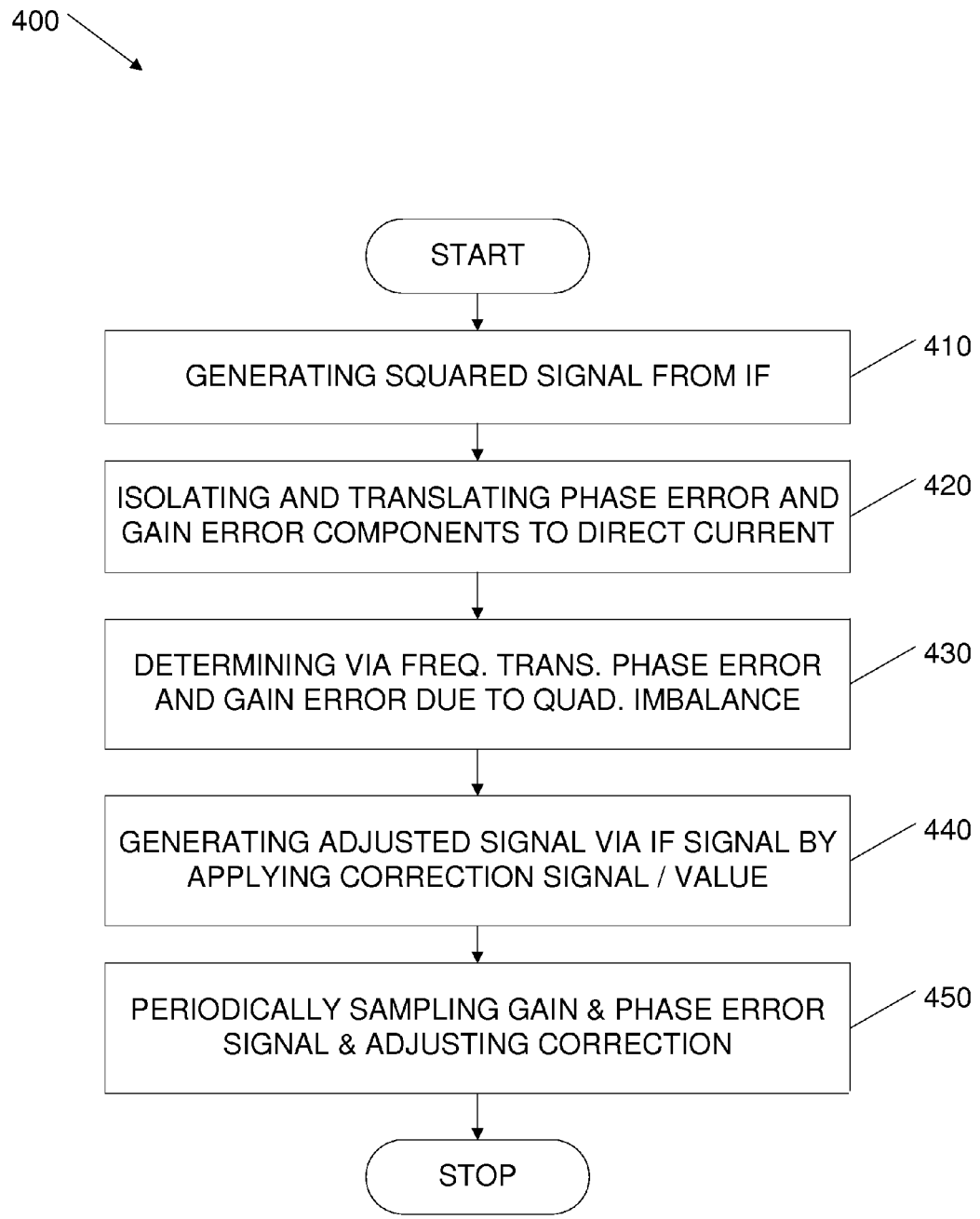
FIG. 4 illustrates a method for correcting errors of phase and gain due to imbalances in a quadrature tuner.

FIG. 4 depicts a flowchart 400 illustrates a method for correcting errors of phase and gain due to imbalances in a quadrature tuner or receiver. Flowchart 400 begins with generating a squared signal from an IF signal (element 410). For example, a multiplier module like multiplier 165 in FIG. 1B may accept the IF signal from a quadrature tuner, apply the signal to both input ports of the multiplier module, and generate a squared signal. In other words, the multiplier module may multiply the IF signal with itself to produce the squared signal. An embodiment may produce the square of an IF signal in the analog domain, which may generate a tone or term in the frequency domain at twice the IF frequency dependent on the level of crosstalk and irrespective of the modulation on the original signal.

The method according to flowchart 400 also includes isolating and translating the phase error and gain error components to DC (element 420). Again referring to FIG. 1B, filter 170 may receive the squared signal from multiplier 165 and attenuate the signal frequency components that are outside the band of centered around the frequency of 2 times the IF. The embodiment may have a detector that is frequency-locked at the frequency equal to 2 times the IF frequency. An embodiment may down-convert the phase error signal to a DC value and down-convert the gain error signal to a DC value.

Upon isolating and translating the phase error and gain error components to DC (element 420), an embodiment according to flowchart 400 involves determining, via the filtering and frequency-translation of the squared signal, relative magnitudes of the phase error and gain error (element 430). Continuing with the previous example, the embodiment of FIG. 1B may take the error signal of interest, which has been down-converted to DC, and sample and digitize the error signal. For example, an embodiment may only need to use an ADC with 1-bit digitization, along with appropriate statistical processing, to periodically determine whether the error is beyond a certain threshold by analysis of the stored sample values. While a 1-bit digitization may be all that is necessary, alternative embodiments may nonetheless employ one or more ADCs with 2 or more bits of sample resolution.

The method according to flowchart 400 also includes generating an adjusted signal from the IF signal 162 by applying the correction signal or correction value (element 440). Again continuing with the example, the digital controller 190 may have sampled the DC down-converted error signals and determined whether the phase error or gain error is large enough to cause an adjustment, such as through the aforementioned statistical processing, averaging, and counting activities. If the phase error needs to be adjusted, digital controller 190 may adjust the phase correction signal 194 and apply it in either the "I" or the "Q" branch during the up-conversion in quadrature tuner 160. For example, the quadrature up-conversion stage 130 in quadrature tuner 160 may include a variable delay element in its quadrature phase generating network, wherein the variable delay element adjusts its delay based on the phase correction signal 194. For gain correction, the quadrature tuner 160 may include one adjustable gain element in each base-band 125 path, wherein each adjustable gain element adjusts the gain in its path based on the gain correction signal(s) 192. The sampling, error calculation, and correction signal adjustment activities may occur periodically (element 450), enabling an embodiment to adjust to changing operating conditions which might alter the amount of quadrature imbalance.

As noted earlier, one or more portions of some embodiments may be implemented as a program product stored in a tangible medium for use with a process to perform operations for processes, such as the processes described in conjunction with the apparatus illustrated in FIG. 1B. The program(s) of the program product defines functions of the embodiments (including the methods described herein) and may be contained on a variety of data-bearing media. Illustrative data-bearing media include, but are not limited to: (i) information permanently stored on non-writable storage media (e.g., read-only memory devices within a station); and (ii) alterable information stored on writable storage media (e.g., flash memory). Such data-bearing media, when carrying computer-readable instructions that direct the functions of devices or systems, represent elements of some embodiments of the present invention.

In general, the routines executed to implement the embodiments, may be part of an operating system or a specific application, component, program, module, object, or sequence of instructions. The computer program of an embodiment may be comprised of a multitude of instructions that will be translated by a computer into a machine-readable format and hence executable instructions. Also, programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus a specific embodiment should not be limited to use solely in any specific application identified and/or implied by such nomenclature.

It will be apparent to those skilled in the art having the benefit of this disclosure that the embodiments herein contemplate systems, apparatuses, and methods for correcting errors of phase imbalance in quadrature tuners or receivers. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
generating a squared signal, in an analog domain, from an intermediary frequency (IF) signal that is an output of a quadrature tuner, wherein the generating the squared signal comprises generating a phase error component and a gain error component associated with the quadrature tuner, wherein further the quadrature tuner comprises an up-conversion stage, a base-band, and a down-conversion stage;
determining, in the analog domain via frequency translation of at least one signal of the phase error component and the gain error component, at least one of a phase error and a gain error, wherein the frequency translation comprises down-converting the at least one signal to direct current (DC) to enable determination of the at least one of the phase error and the gain error, wherein generating the squared signal and determining the at least one of the phase error and the gain error are enabled without test tone injection, wherein the determining the at least one of the phase error and the gain error comprises attenuating components of the squared signal outside a band centered at a frequency equal to two times the frequency of the IF signal; and generating an adjusted signal as the output of the quadrature tuner by application of at least one of a phase correction signal to a variable delay element in the up-conversion stage of the quadrature tuner and a gain correction value to an adjustable gain element in the base-band of the quadrature tuner, wherein the at least one of the phase correction signal and the gain correction value is generated via the determining the at least one of the phase error and the gain error.

2. The method of claim 1, wherein the down-converting the phase error signal to DC comprises mixing the phase error signal with a frequency equal to cos(2 wt−pi/2), wherein further the determining the phase error enables the generation of the phase correction signal.

3. The method of claim 2, wherein the generating the adjusted signal comprises substantially cancelling the phase error of the IF signal by application of the phase correction signal to the IF signal in the up-conversion stage, wherein further the down-converting the phase error signal occurs in an analog section of the quadrature tuner.

4. The method of claim 1, wherein the down-converting the gain error signal to DC comprises mixing the gain error signal with a frequency equal to cos(2 wt), wherein further the determining the gain error enables the generation of the gain correction value.

5. The method of claim 4, further comprising: adjusting, based on the gain correction value, gain elements in each base-band path of the quadrature tuner for correction of the gain error of the IF signal, wherein further the down-converting the gain error signal occurs in an analog section of the quadrature tuner.

6. The method of claim 5, further comprising: periodically sampling, via a single-bit analog-to-digital converter (ADC), the down-converted gain error signal, wherein the periodic sampling enables the periodic comparison of accumulated sample values to a threshold, wherein further the periodic comparison enables changing the value of a counter, wherein further the value of the counter determines whether the gain correction value is incremented or decremented.

7. An apparatus, comprising:
a multiplier module configured to receive an intermediary frequency (IF) signal from the output of a quadrature tuner and generate a squared signal in an analog domain, wherein the quadrature tuner comprises a down-conversion stage, a base-band, and an up-conversion stage, wherein further the squared signal comprises a phase error component and a gain error component due to imbalance of the quadrature tuner;

a frequency translation module configured to down-convert signals of phase error and gain error in the analog domain from the squared signal to direct current (DC), wherein the down-conversion of the squared signals of phase error and gain error enable the generation of a phase correction signal and a gain correction value, wherein generation of the squared signal and generation of the phase correction signal and the gain correction value are enabled without test tone injection, wherein the frequency translation module comprises a first filter module configured to attenuate components of the squared signal outside a band centered at a frequency equal to two times the frequency of the IF signal; and a digital controller configured to apply the phase correction signal to a variable delay element in the up-conversion stage of the quadrature tuner and the gain correction value to an adjustable gain element in the base-band of the quadrature tuner, wherein the application of the phase correction signal and the gain correction value comprises generation of an adjusted signal as the output of the quadrature tuner.

8. The apparatus of claim 7, wherein the frequency translation module comprises an element of adjustable phase, wherein the element of adjustable phase enables the frequency translation module to adjust the phase of a signal applied to a mixer for the down-conversion of the error signals to DC, wherein further the signal with the adjustable phase has a frequency that is double the IF frequency.

9. The apparatus of claim 8, wherein the frequency translation module comprises a second filter module configured to attenuate the non-DC components from the output of the mixer, wherein the second filter module is configured to enable the digital controller to periodically sample the analog waveform associated with the down-converted error signals.

10. The apparatus of claim 9, wherein the digital controller is configured to periodically sample the analog waveform via a single-bit analog-to-digital converter (ADC), accumulate the samples, compare the accumulated samples with a threshold, and adjust at least one of the phase correction signal and the gain correction value based on the comparison with the threshold.

11. The apparatus of claim 10, wherein the digital controller comprises at least one of dynamic random access memory (DRAM) and static RAM (SRAM) to store the samples.

12. The apparatus of claim 11, wherein the digital controller is configured to enable application of the phase correction signal to the IF signal via a variable delay element in the quadrature phase generation network of the quadrature tuner.

13. The apparatus of claim 12, wherein the digital controller is configured to enable application of the gain correction value to the IF signal via one adjustable gain element in each base-band path of the quadrature tuner.

14. The apparatus of claim 13, wherein the digital controller is configured to apply the phase correction signal and the gain correction value to the IF signal in the analog domain of the quadrature tuner.

15. The apparatus of claim 14, wherein the digital controller is configured to apply the phase correction signal and the gain correction value to the IF signal while the quadrature tuner is online.

16. A system, comprising:
a quadrature tuner coupled to an antenna and to output an intermediary frequency (IF) signal, wherein the quadrature tuner comprises a down-conversion stage, a base-band with an adjustable gain element to adjust a gain of the IF signal based upon a gain correction value, and an up-conversion stage with a variable delay element to adjust a delay of the IF signal based upon a phase correction signal;

a multiplier module configured to receive the IF signal from the output of the quadrature tuner and generate a squared signal in an analog domain, wherein further the squared signal comprises a phase error component and a gain error component associated with the quadrature tuner;

a frequency translation module configured to down-convert signals of phase error and gain error from the squared signal to direct current (DC) in the analog domain, wherein the down-conversion of the signals of phase error and gain error enable the generation of the phase correction signal and the gain correction value for correction of quadrature imbalance of the IF signal, wherein generation of the squared signal and generation of the phase correction signal and the gain correction value are enabled without test tone injection, wherein the frequency translation module comprises a first filter module configured to attenuate components of the squared signal outside a band centered at a frequency equal to two times the frequency of the IF signal; and a digital controller configured to apply the chase correction signal to the variable delay element in the up-conversion stage of the quadrature tuner and the gain correction value to the adjustable gain element in the base-band of the quadrature tuner, wherein the application of the phase correction signal and the gain correction value comprises generation of an adjusted signal as the output of the quadrature tuner.

17. The system of claim 16, wherein the quadrature tuner comprises a media access control (MAC) module configured to communicate with an 802.11g wireless network.

18. The system of claim 16, wherein the antenna comprises a cell phone antenna.

* * * * *